US009406164B2

(12) United States Patent
Kho et al.

(10) Patent No.: US 9,406,164 B2
(45) Date of Patent: Aug. 2, 2016

(54) APPARATUS AND METHOD OF MULTI-VIEW RENDERING

(75) Inventors: Young-ihn Kho, Seoul (KR); Do-kyoon Kim, Seongnam-si (KR); Tae-hyun Rhee, Yongin-si (KR); Min-su Ahn, Seoul (KR); Hee-sae Lee, Yongin-si (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 394 days.

(21) Appl. No.: 13/556,479

(22) Filed: Jul. 24, 2012

(65) Prior Publication Data

US 2013/0027394 A1    Jan. 31, 2013

(30) Foreign Application Priority Data

Jul. 25, 2011    (KR) .................. 10-2011-0073776

(51) Int. Cl.
*G06T 15/00*    (2011.01)
*G06T 15/20*    (2011.01)

(52) U.S. Cl.
CPC .................. *G06T 15/205* (2013.01)

(58) Field of Classification Search
CPC .............. G06T 15/06; G06T 15/20–15/205; G06T 15/50–15/87; G06T 19/20
USPC ................................ 345/419–427
See application file for complete search history.

(56) References Cited

U.S. PATENT DOCUMENTS

| 5,574,836 | A | * | 11/1996 | Broemmelsiek | 345/427 |
| 6,057,847 | A | * | 5/2000 | Jenkins | 345/422 |
| 6,417,850 | B1 | * | 7/2002 | Kang | 345/422 |
| 7,385,604 | B1 | * | 6/2008 | Bastos | 345/426 |
| 2009/0153557 | A1 | | 6/2009 | Dimitrov et al. | |
| 2011/0141104 | A1 | * | 6/2011 | Tin | 345/419 |

FOREIGN PATENT DOCUMENTS

| KR | 10-0267259 B1 | 10/2000 |
| KR | 10-0590025 B1 | 6/2006 |
| KR | 10-0745691 B1 | 8/2007 |
| KR | 10-2009-0038932 A | 4/2009 |
| WO | WO 2009/083885 A1 | 7/2009 |

OTHER PUBLICATIONS

Oh et al., Real-Time Rendering of Multi-View Images from a Single Image with Depth, International Conference on Computational Science and Its Applications, Aug. 2007, pp. 505-509.*

(Continued)

*Primary Examiner* — Charles Tseng
(74) *Attorney, Agent, or Firm* — NSIP Law

(57) ABSTRACT

Provided is an apparatus and method of multi-view rendering. A method of multi-view rendering includes rendering one or more 3D objects based on a first viewpoint, transforming pixel values of pixels of the first viewpoint, which are obtained by the rendering of the 3D objects, into pixel values of pixels based on a second viewpoint that is different from the first viewpoint, detecting an occlusion region that is a remaining region other than a region represented by the pixel values obtained by the transforming of the pixel values in an image based on the second viewpoint, and rendering the detected occlusion region based on the second viewpoint.

18 Claims, 8 Drawing Sheets

(56) References Cited

OTHER PUBLICATIONS

Jones et al., Rendering for an Interactive 360 Degree Light Field Display, ACM Trans. Graph. 26, 3, Article 40, Jul. 2007.*

Korean Office Action issued on Jul. 31, 2013 in counterpart Korean Patent Application No. 10-2011-0073776. (8 pages including English translation).

Kim, Hyowon et al., "Image reprojection by using GPU", Korean HCI Forum, 2007, p. 170-175 (Feb. 5, 2007).

McVeigh, Jeffrey S., Mel W. Siegel, and Angel G. Jordan. "Intermediate view synthesis considering occluded and ambiguously referenced image regions." Signal Processing: Image Communication 9.1 (1996): 21-28.

* cited by examiner

APPARATUS AND METHOD OF MULTI-VIEW RENDERING

CROSS-REFERENCE TO RELATED APPLICATIONS

This application claims the benefit under 35 U.S.C. §119(a) of Korean Patent Application No. 10-2011-0073776, filed on Jul. 25, 2011, in the Korean Intellectual Property Office, the entire disclosure of which is incorporated herein by reference for all purposes.

BACKGROUND

1. Field

The following description relates to apparatuses and methods of multi-view rendering.

2. Description of the Related Art

Three-dimensional (3D) display technology allows a viewer to recognize an image displayed on a screen in a 3D manner. Examples of 3D display technology are based on binocular disparity to give the viewer of the image a 3D stereoscopic sense, such as, for example, a depth sense or a perspective sense. For example, images obtained from two different viewpoints are viewed by a left eye and a right eye of a viewer, thereby enabling the viewer to experience the 3D stereoscopic sense.

A glass-type stereoscopic display is an example of a 3D display that enables the left eye and the right eye of the viewer to observe images obtained from two different viewpoints using 3D glasses, thereby enabling the viewer to experience the 3D stereoscopic sense. A multi-view 3D display is an example of a 3D display that enables the viewer to observe images obtained from multiple viewpoints without wearing 3D glasses.

In the multi-view 3D display, images obtained from multiple viewpoints are spatially mapped to a plurality of divided viewing zones, thereby enabling the viewer to observe the images obtained from different viewpoints according to a position in which the viewer observes the images. The multi-view 3D display uses images obtained from as many viewpoints as the number of viewpoints set for a multi-view display to reproduce a 3D image. The images are obtained by rendering 3D objects from each of the viewpoints set for the multi-view 3D display.

FIG. 1 is a diagram illustrating an example of a multi-view 3D display. In the multi-view 3D display, images obtained from a plurality of viewpoints are spatially mapped to a plurality of divided viewing zones so that viewers observe images from different viewpoints according to viewing positions. Referring to the example illustrated in FIG. 1, the viewers observe images 150, 160, 170, and 180 obtained from different viewpoints of a 3D object according to viewing positions 110, 120, 130, and 140 while viewing the same scene 100.

The multi-view 3D display reproduces a 3D image by obtaining images from the viewpoints of the multi-view 3D display. That is, rendering of 3D objects is performed in each of the viewpoints of the multi-view 3D display. A rendering operation is used by the multi-view 3D display to perform a large number of calculations repeatedly for each of the viewpoints of the multi-view 3D display. To efficiently perform the repeated calculations and provide quality 3D images, the multi-view 3D display is enabled to supply the rendering operation with a large amount of time and optimal hardware performance.

SUMMARY

In one general aspect, a method of multi-view rendering includes rendering one or more 3D objects based on a first viewpoint, transforming pixel values of pixels of the first viewpoint, which are obtained by the rendering of the 3D objects, into pixel values of pixels based on a second viewpoint that is different from the first viewpoint, detecting an occlusion region that is a remaining region other than a region represented by the pixel values obtained by the transforming of the pixel values in an image based on the second viewpoint, and rendering the detected occlusion region based on the second viewpoint.

The method may include that the second viewpoint includes one or more of a plurality of viewpoints set for a multi-view 3D display and disposed closest to the first viewpoint in a 3D space.

The method may include that the transforming of the pixel values includes obtaining positions of pixels of the second viewpoint corresponding to the pixels of the first viewpoint, and obtaining pixel values of the pixels of the second viewpoint by allocating the pixel values of the pixels of the first viewpoint to the pixels of the second viewpoint on the corresponding positions.

The method may include that the detecting of the occlusion region includes obtaining coordinate values of the pixels that constitute the remaining region.

The method may include that the transforming of the pixel values further includes obtaining a position of the 3D objects in a 3D space and obtaining positions of the pixels of the second viewpoint, the obtaining of the positions of the 3D objects being based on a depth map obtained as a result of the rendering of the 3D objects, the obtaining of the positions of the pixels being based on the obtained position of the 3D objects in the 3D space and a difference between the first viewpoint and the second viewpoint.

The method may include generating an image based on the second viewpoint, the generated image being based on the transformed pixel values and pixel values obtained based on the rendering of the detected occlusion region.

The method may include generating an image based on each of a plurality of viewpoints set for a multi-view 3D display, the generating of the image based on each of the plurality of viewpoints set for the multi-view 3D display including repeatedly performing the rendering of the 3D objects, the transforming of the pixel values based on the first viewpoint, the detecting of the occlusion region, the rendering of the detected occlusion region, and the generating of the image based on the second viewpoint.

The method may include that the generated image based on each of the plurality of viewpoints set for the multi-view 3D display includes pixel values obtained by the rendering of the 3D objects and the detected occlusion region and the transformed pixel values.

The method may include that the generating of the image based on each of the plurality of viewpoints set for the multi-view 3D display further includes combining the pixel values obtained by the rendering of the 3D objects and the detected occlusion region and the transformed pixel values.

The method may include that the rendering of the 3D objects includes emitting rays in a direction of pixels on a screen, tracing a path on which rays emitted from the pixels are refracted or reflected, and determining a color of the pixels.

In another aspect, there is provided a computer-readable recording medium having recorded thereon a program for executing the method of multi-view rendering.

In yet another aspect, a multi-view rendering apparatus includes a rendering unit configured to render one or more 3D objects based on a first viewpoint and an occlusion region based on a second viewpoint that is different from the first viewpoint, a pixel value transformation unit configured to transform pixel values of pixels of the first viewpoint, which are obtained by the rendering of the 3D objects, into pixel values of pixels based on the second viewpoint, and an occlusion detecting unit configured to detect the occlusion region, the occlusion region being a remaining region other than a region represented by the transformed pixel values obtained by the pixel value transformation unit in an image based on the second viewpoint.

The apparatus may include that the second viewpoint includes one or more of a plurality of viewpoints set for a multi-view 3D display and disposed closest to the first viewpoint in a 3D space.

The apparatus may include that the pixel value transformation unit is further configured to obtain positions of pixels of the second viewpoint corresponding to the pixels of the first viewpoint and obtain pixel values of the pixels of the second viewpoint by allocating the pixel values of the pixels of the first viewpoint to the pixels of the second viewpoint on the corresponding positions.

The apparatus may include that the occlusion region detecting unit is further configured to obtain coordinate values of the pixels that constitute the remaining region to detect the occlusion region.

The apparatus may include that positions of the pixels of the second viewpoint are obtained based on a position of the 3D objects in a 3D space and a difference between the first viewpoint and the second viewpoint, and the position of the 3D objects in the 3D spaces is obtained based on a depth map obtained by the rendering of the 3D objects of the rendering unit.

The apparatus may include an image generating unit configured to generate an image based on the second viewpoint and an image based on each of a plurality of viewpoints set for a multi-view 3D display, the generated image based on the second viewpoint being based on the transformed pixel values and pixel values obtained by the rendering of the detected occlusion region, the image based on each of the plurality of viewpoints set for a multi-view 3D display being generated by repeatedly performing the rendering of the 3D objects based on a first viewpoint, the transforming of the pixel values, the detecting of the occlusion region, the rendering of the detected occlusion region, and the generating of the image based on the second viewpoint.

The apparatus may include that the generated image based on each of the plurality of viewpoints set for the multi-view 3D display includes pixel values obtained by the rendering of the 3D objects and the detected occlusion region and the transformed pixel values.

The apparatus may include that the image generating unit is further configured to combine the pixel values obtained by the rendering of the 3D objects and the detected occlusion region and the transformed pixel values to generate the image based on each of the plurality of viewpoints set for the multi-view 3D display.

The apparatus may include that the rendering unit is further configured to emit rays in a direction of pixels on a screen, trace a path on which rays emitted from the pixels are refracted or reflected, and determine a color of the pixels.

Other features and aspects may be apparent from the following detailed description, the drawings, and the claims.

Figure 1:
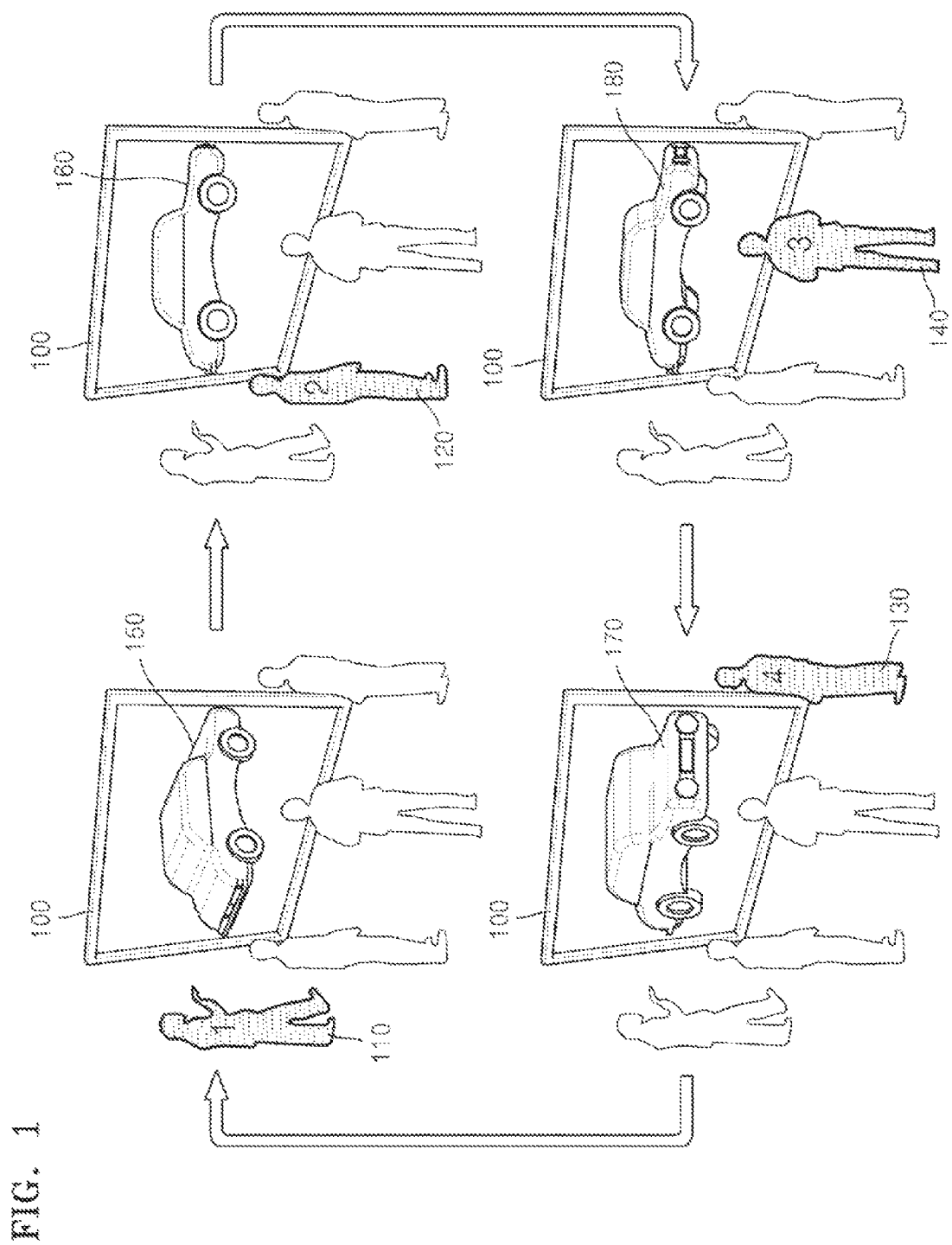
FIG. 1 is a diagram illustrating an example of a multi-view 3D display.

Throughout the drawings and the detailed description, unless otherwise described, the same drawing reference numerals will be understood to refer to the same elements, features, and structures. The relative size and depiction of these elements may be exaggerated for clarity, illustration, and convenience.

DETAILED DESCRIPTION

The following detailed description is provided to assist the reader in gaining a comprehensive understanding of the methods, apparatuses, and/or systems described herein. Accordingly, various changes, modifications, and equivalents of the systems, apparatuses and/or methods described herein will be suggested to those of ordinary skill in the art. In addition, descriptions of well-known functions and constructions may be omitted for increased clarity and conciseness.

Figure 2:
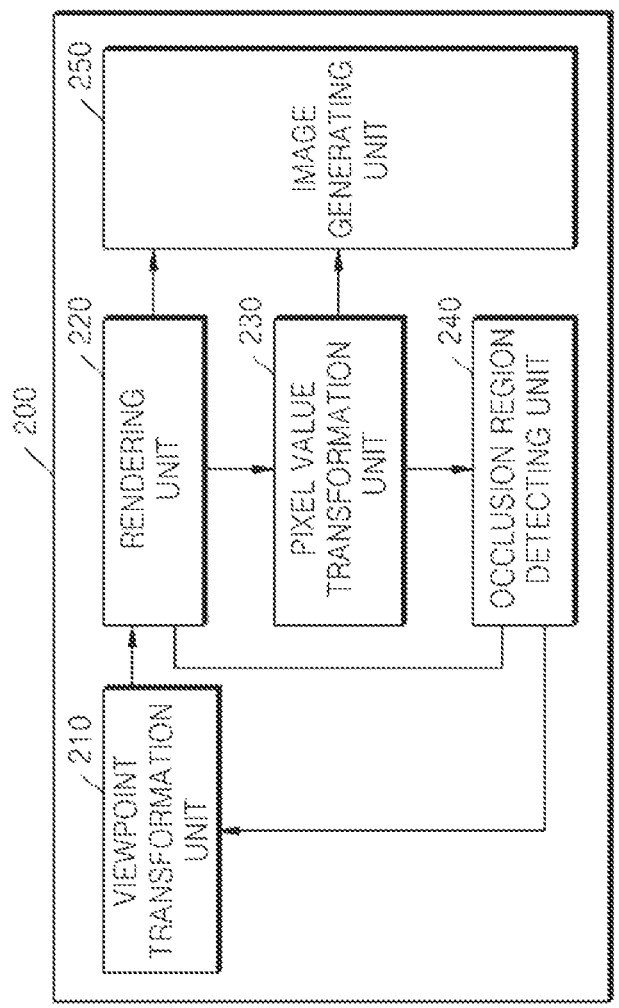
FIG. 2 is a block diagram illustrating an example of a multi-view rendering apparatus.

FIG. 2 is a block diagram illustrating an example of a multi-view rendering apparatus 200. Referring to the example illustrated in FIG. 2, the multi-view rendering apparatus 200 includes a viewpoint transformation unit 210, a rendering unit 220, a pixel value transformation unit 230, an occlusion region detecting unit 240, and an image generating unit 250.

The multi-view rendering apparatus 200 of FIG. 2 performs multi-view rendering of 3D objects for a multi-view 3D display. In this regard, the multi-view rendering apparatus 200 performs rendering of the 3D objects from a plurality of slightly different viewpoints.

In 3D computer graphics, rendering displays 3D objects in a 3D space on a two-dimensional (2D) screen by adding 3D factors, such as, for example, color, contrast, texture, and shadow, to the 3D objects based on a scene displayed from an observer's point of view to achieves a sense of reality. Through operations of 3D computer graphics, the 3D objects are displayed on the 2D screen by performing 3D modeling of the 3D objects in a computer, generating modeling data of the 3D objects having 3D coordinate values, setting texture, light, and a camera position, performing rendering of the 3D objects based on a designated viewpoint, and configuring a scene displayed on a 2D graphics screen.

Modeling is a 3D representation of the shape of a real life object or a virtual object, or, in other words, a mathematical representation of the position of the 3D objects based on 3D space coordinates. Based on modeling, 3D modeling data is obtained having 3D coordinate values. That is, after receiving the modeling data regarding the 3D objects generated by the modeling of the 3D graphics, the multi-view rendering apparatus 200 of FIG. 2 generates images from multiple viewpoints for a multi-view 3D display on a 2D graphics screen based on the modeling data of the 3D objects. Each of the images corresponds to a respective scene in which 3D objects are viewed from each of the multiple viewpoints.

In an example, a rasterization method or a ray tracing method is used to render 3D objects. In the rasterization method, rendering is performed in consideration of only a light source that emits light directly onto surfaces of the 3D objects. In the ray tracing method, rendering is performed in consideration of reflection or refraction between the 3D objects. The multi-view rendering apparatus 200 performs rendering based on the ray tracing method.

In an example, the ray tracing method includes the emission of rays in a direction of each of pixels on a screen from an observer's viewpoint. A path on which rays emitted from each pixel are refracted or reflected is reversely traced to calculate all light irradiated onto the surfaces of the 3D objects, thereby determining contrast and color of each pixel. A detailed description thereof will be provided in association with the rendering unit 220.

The viewpoint transformation unit 210 illustrated in FIG. 2 transforms a viewpoint that is a base for rendering to be performed by the rendering unit 220. When 3D objects are displayed on a 2D graphics screen in 3D graphics, before rendering is performed, a position and a direction of an observation of a scene of the 3D objects is designated. That is, an observation viewpoint of a scene of the 3D objects is designated before rendering is performed to obtain 3D graphics data of a desired scene regarding the 3D objects.

Since, in a multi-view 3D display, images from different viewpoints are observed according to viewing positions, images are obtained from each of the multiple viewpoints for the multi-view 3D display. Thus, the multi-view rendering apparatus 200 obtains 3D graphics data by differing observation viewpoints depending on each of the multiple viewpoints for a 3D multi-view display. That is, when a viewpoint to render the same 3D object in the 3D space differs, scenes on which the 3D objects are displayed are slightly different. Thus, the multi-view rendering apparatus 200 performs rendering of the 3D objects by slightly differing an observation viewpoint to obtain images from each of multiple viewpoints for the multi-view 3D display. In order to perform rendering of the 3D objects from each of the slightly different multiple viewpoints, the viewpoint transformation unit 210 of the multi-view rendering apparatus 200 transforms a viewpoint for rendering.

The viewpoint transformation unit 210 transforms a reference viewpoint for rendering based on coordinates of the 3D objects in the 3D space. That is, the viewpoint transformation unit 210 transforms the reference viewpoint for rendering by transforming positions, shapes, sizes, and any other coordinate known to one of ordinary skill in the art of the 3D objects that are represented as 3D coordinate values. In this regard, the transforming of positions, shapes, sizes, and any other coordinate known to one of ordinary skill in the art of the 3D objects is referred to as geometric transformation. Calculations of geometric transformation are performed based on 4×4 transformation matrices, such as a translation transformation matrix, a scaling transformation matrix, a rotation transformation matrix, or any other 4×4 transformation matrix known to one of ordinary skill in the art, thereby moving the 3D objects in the 3D space, transforming the sizes of the 3D objects, or rotating the 3D objects.

In an example, by performing calculations of the 3D objects based on the following transformation matrix equations of geometric transformation in the 3D graphics, the 3D objects are moved in the 3D space, the sizes of the 3D objects are transformed, or the 3D objects are rotated. For example, Equation 1 is a transformation matrix representing translation transformation in the 3D space that transforms into a point P(x', y', z') by moving one point P(x, y, z) in the 3D space by $t_x$, $t_y$, and $t_z$ in a direction of each axis.

$$p' = \begin{pmatrix} x' \\ y' \\ z' \\ 1 \end{pmatrix} = \begin{pmatrix} 1 & 0 & 0 & t_x \\ 0 & 1 & 0 & t_y \\ 0 & 0 & 1 & t_z \\ 0 & 0 & 0 & 1 \end{pmatrix} \begin{pmatrix} x \\ y \\ z \\ 1 \end{pmatrix} = T(t_x, t_y, t_z) \cdot P \quad \langle \text{Equation 1} \rangle$$

Equation 2 is a transformation matrix representing scaling transformation in the 3D space that transforms from a point P(x, y, z) into a point P(x', y', z') based on an origin by increasing or decreasing a distance from the origin to one point P(x, y, z) by $s_x$, $s_y$, and $s_z$ in a direction of each axis.

$$p' = \begin{pmatrix} x' \\ y' \\ z' \\ 1 \end{pmatrix} = \begin{pmatrix} s_x & 0 & 0 & 0 \\ 0 & s_y & 0 & 0 \\ 0 & 0 & s_z & 0 \\ 0 & 0 & 0 & 1 \end{pmatrix} \begin{pmatrix} x \\ y \\ z \\ 1 \end{pmatrix} = S(s_x, s_y, s_z) \cdot P \quad \langle \text{Equation 2} \rangle$$

Equation 3 is a transformation matrix representing rotation transformation in the 3D space that transforms into a point P(x', y', z') by rotating one point P(x, y, z) in the 3D space by Θ based on a z-axis.

$$p' = \begin{pmatrix} x' \\ y' \\ z' \\ 1 \end{pmatrix} = \begin{pmatrix} \cos\Theta & -\sin\Theta & 0 & 0 \\ \sin\Theta & \cos\Theta & 0 & 0 \\ 0 & 0 & 1 & 0 \\ 0 & 0 & 0 & 1 \end{pmatrix} \begin{pmatrix} x \\ y \\ z \\ 1 \end{pmatrix} = R_z(\Theta) \cdot P \quad \langle \text{Equation 3} \rangle$$

Along with translation transformation, scaling transformation, and rotation transformation of Equations 1, 2, and 3, respectively, geometric transformation includes generating a new object or transforming a coordinate system to transform coordinates in the 3D space. The viewpoint transformation unit 210 transforms a viewpoint for rendering based on geometric transformation in the 3D graphics.

In an example, the viewpoint transformation unit 210 transforms a viewpoint for rendering by performing transformation of a coordinate system. 3D graphics are based on several coordinate systems, such as a world coordinate system, a viewing coordinate system, and any other applicable coordinate system known to one of ordinary skill in the art to display 3D objects on a 2D graphics screen. The world coordinate system represents an absolute position of the 3D objects in the 3D space. The viewing coordinate system is displayed based on an observation viewpoint to represent a scene of the 3D objects observed from a single observation viewpoint on the 2D graphics screen. In order to represent the scene of the 3D objects observed from a single observation viewpoint on the 2D graphics screen, the position of the 3D objects in the world coordinate system is transformed into the position of the 3D objects in the viewing coordinate system. In this example, the viewpoint transformation unit 210 transforms the viewing coordinate system based on a single observation viewpoint into the viewing coordinate system based on a different viewpoint from the single observation viewpoint, thereby transforming a viewpoint for rendering.

The viewpoint transformation unit 210 transforms a viewpoint for rendering by transforming the viewing coordinate system according to the viewpoint for rendering to render the 3D objects based on the viewing coordinate system according to a first viewpoint (hereinafter, referred to as a first coordinate system) and based on the viewing coordinate system according to a second viewpoint (hereinafter, referred to as a second coordinate system).

Figure 3:
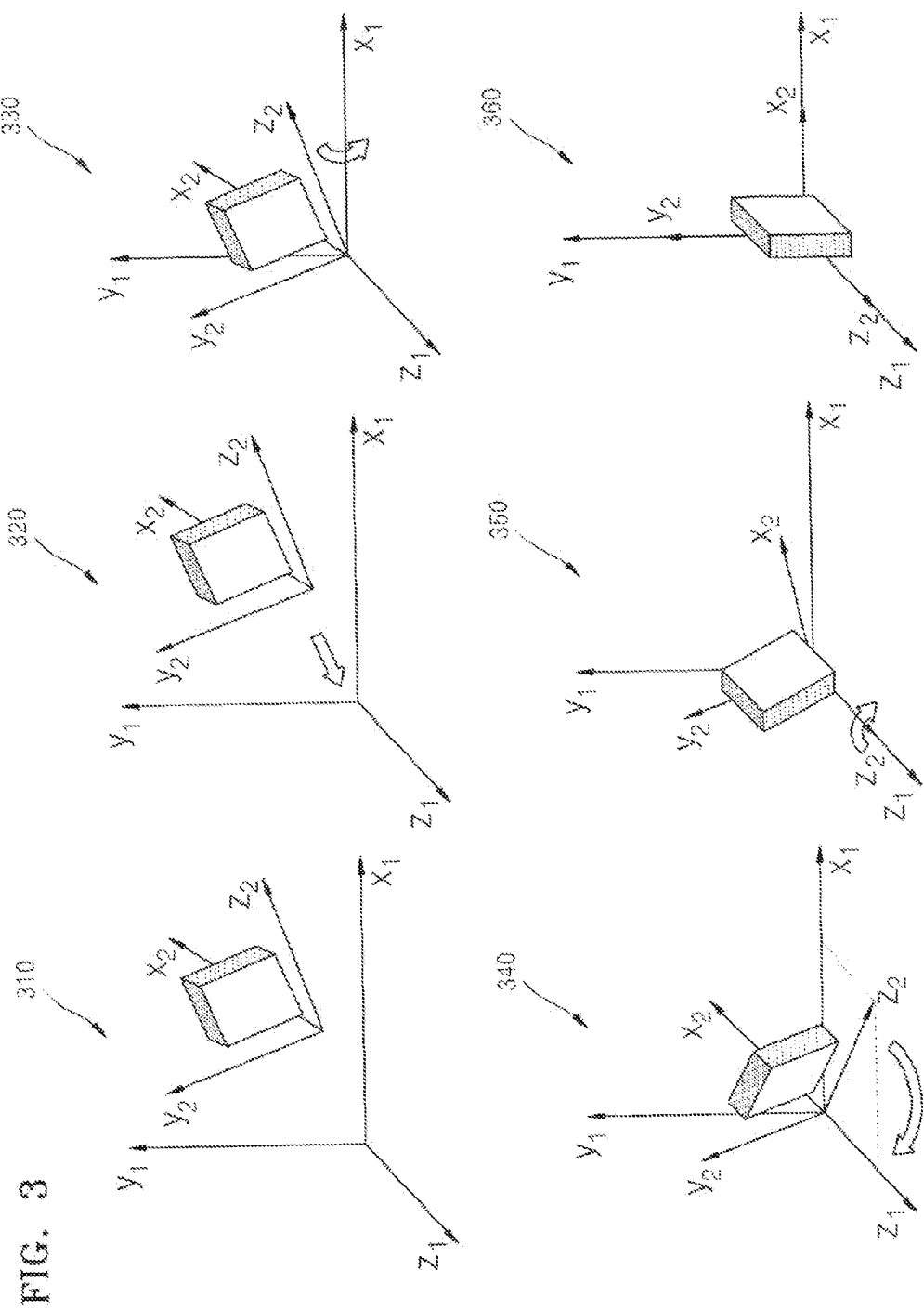
FIG. 3 is a diagram illustrating an example of viewpoint transformation of a viewpoint transformation unit of the multi-view rendering apparatus illustrated in FIG. 2.

FIG. 3 is a diagram illustrating an example of viewpoint transformation of a viewpoint transformation unit 210 of the multi-view rendering apparatus 200 illustrated in FIG. 2. Referring to the example illustrated in FIG. 3, a first coordinate system and a second coordinate system are shown in illustration 310. The first coordinate system has $x_1$, $y_1$, and $z_1$ as an x-axis, a y-axis, and a z-axis, respectively. The second coordinate system has $x_2$, $y_2$, and $z_2$ as the x-axis, the y-axis, and the z-axis, respectively. The viewpoint transformation unit 210 performs (310) transformation of a coordinate system by matching the second coordinate system with the first coordinate system to transform the first viewpoint into the second viewpoint.

An origin of the second coordinate system and an origin of the first coordinate system are matched (320) by moving the second coordinate system based on a translation transformation. The second coordinate system is rotated (330) based on an $x_1$-axis of the first coordinate system so that a $z_2$-axis of the second coordinate system may be put on a $z_1x_1$-plane of the first coordinate system. In order to match z-axes of the first and second coordinate systems, the second coordinate system is rotated (340) based on a $y_1$-axis of the first coordinate system. The first and second coordinate systems are matched (350, 360) by rotating the second coordinate system based on a $z_1$-axis of the first coordinate system.

A viewpoint for rendering is transformed by performing transformation of a coordinate system that matches the first coordinate system with the second coordinate system by multiplying all transformation matrices with respect to translation transformation (320) and rotation transformations (330, 340, 350, 360). However, a viewpoint for rendering may be transformed based on various methods using several types of geometric transformation. A more detailed description of geometric transformation may be referred to by "Computer Graphics: Principles and Practice in C" written by James D. Foley, Andries van Dam, Steven K. Feiner, John F. Hughes.

When the multi-view rendering apparatus 200 of FIG. 2 performs rendering based on a viewpoint that is set according to a single observation viewpoint and performs rendering again from a different viewpoint from the set viewpoint, the viewpoint transformation unit 210 transforms the set viewpoint for rendering into a new viewpoint based on the viewpoint transformation example illustrated in FIG. 3. In other words, the multi-view rendering apparatus 200 of FIG. 2 performs rendering by sequentially transforming multiple viewpoints that are set for a multi-view 3D display, thereby obtaining an image from each of the multiple viewpoints.

Figure 4:
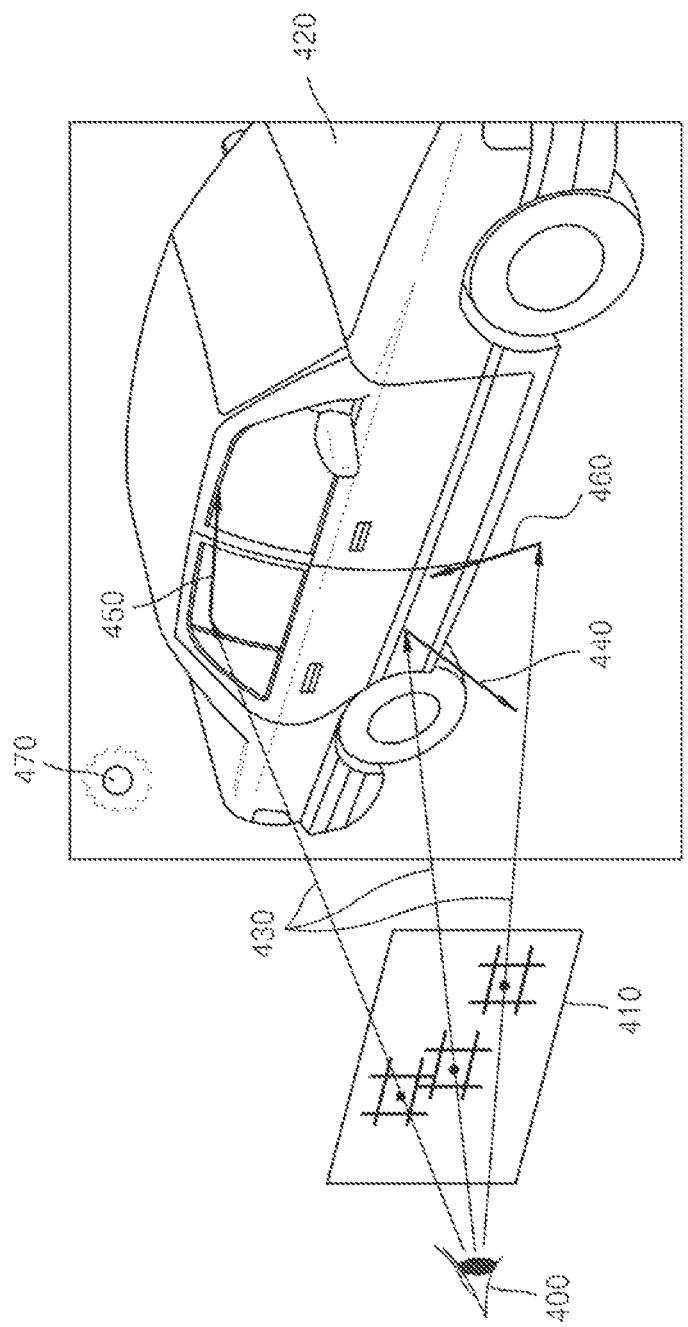
FIG. 4 is a diagram illustrating an example of a rendering operation of a rendering unit of the multi-view rendering apparatus illustrated in FIG. 2.

The rendering unit 220 illustrated in FIG. 2 performs rendering from an observer's single viewpoint. FIG. 4 is a diagram illustrating an example of a rendering operation of a rendering unit 220 of the multi-view rendering apparatus 200 illustrated in FIG. 2. Referring to the example illustrated in FIG. 4, rays are emitted in a direction of pixels on a screen 410 from a single viewpoint 400 of an observer. A primary ray 430 emitted from each of the pixels on the screen 410 proceeds in the 3D space and collides with an object 420 that is disposed closest to the single viewpoint 400 of the observer. In this case, when the surface of the object 420 is a reflection surface, the primary ray 430 generates a reflection ray 440 to obtain a reflected image after colliding with the object 420. When the surface of the object 420 is a refraction surface, the primary ray 430 generates a refraction ray 450 to obtain a refracted image after colliding with the object 420.

When the primary ray 430, the reflection ray 440, and the refraction ray 450 collide with a light source 470, do not collide with the object 420, or repeat a predetermined maximum number of repetitions, or the intensity of light caused by reflection and refraction is less than a reference value, the rendering unit 220 stops ray tracing and calculates brightness of pixels by adding all intensity values of lights of traced rays. In addition, the primary ray 430 that collides with the object 420 generates a shadow ray 460 towards the light source 470, thereby determining whether one point on the surface of the object 420 includes shadow. The rendering unit 220 calculates the amount of light irradiated onto the surface of the object 420 through this procedure, thereby determining contrast and color of each pixel. Thus, a color value of each pixel on the screen 410 is obtained.

In addition, the rendering unit 220 obtains a depth value that is a distance from each pixel to the object 420 in the 3D space through the performing of the rendering. In an example, the rendering unit 220 determines visibility of 3D objects and outputs a color value of the object that is disposed closest to the single viewpoint 400 of the observer. That is, the rendering unit 220 calculates positions of points at which rays emitted from each pixel and each object in the 3D space intersect, thereby calculating only a color value of a point that is disposed closest to the single viewpoint 400 of the observer. In this case, the depth value is represented by a distance from each pixel from which rays are emitted to the point at which the rays and the object intersect. A depth map represents the calculation of the depth value of each pixel and a mapping of the calculated depth values onto a scene.

Based on the performing of the rendering based on the rendering unit 220, the 3D space is mapped to each pixel on a scene. A pixel value represents information regarding a pixel including a color value and the depth value mapped to each pixel. Through the performing of the rendering, the rendering unit 220 obtains information regarding the image that is rendered based on a single viewpoint. The information regarding the rendered image is a pixel value of each pixel on a scene. The rendering unit 220 outputs the information regarding the image that is rendered based on a single viewpoint to the image generation unit 250 to generate a multi-view image for a multi-view 3D image display. In addition, the rendering unit 220 outputs the information regarding the image that is rendered based on a single viewpoint to the pixel value transformation unit 230 to generate image information from adjacent different viewpoints without performing rendering. That is, the rendering unit 220 outputs pixel values that are obtained based on a single viewpoint to the image generating unit 250 and the pixel value transformation unit 230.

In an example, the multi-view rendering apparatus 200 obtains image information from different viewpoints without performing rendering based on the result of rendering performed by the rendering unit 220 from some of viewpoints and performs rendering only in some regions in which the image information cannot be obtained, thereby generating a multi-view 3D image. The pixel value transformation unit 230 receives pixel values that are image information rendered from a first viewpoint from the rendering unit 220 and transforms the pixel values of the first viewpoint into pixel values based on a second viewpoint that is different from the first viewpoint. In this regard, the first viewpoint is referred to as a viewpoint for which rendering has been performed by the rendering unit 220, and the second viewpoint is referred to as a new viewpoint that is adjacent to the viewpoint for which rendering has been performed. In an example, the new viewpoint that is adjacent to the viewpoint for which rendering has been performed is one of a plurality of viewpoints set for a multi-view 3D image display that is disposed closest to the viewpoint for which rendering has been performed in the 3D space.

Figure 6:
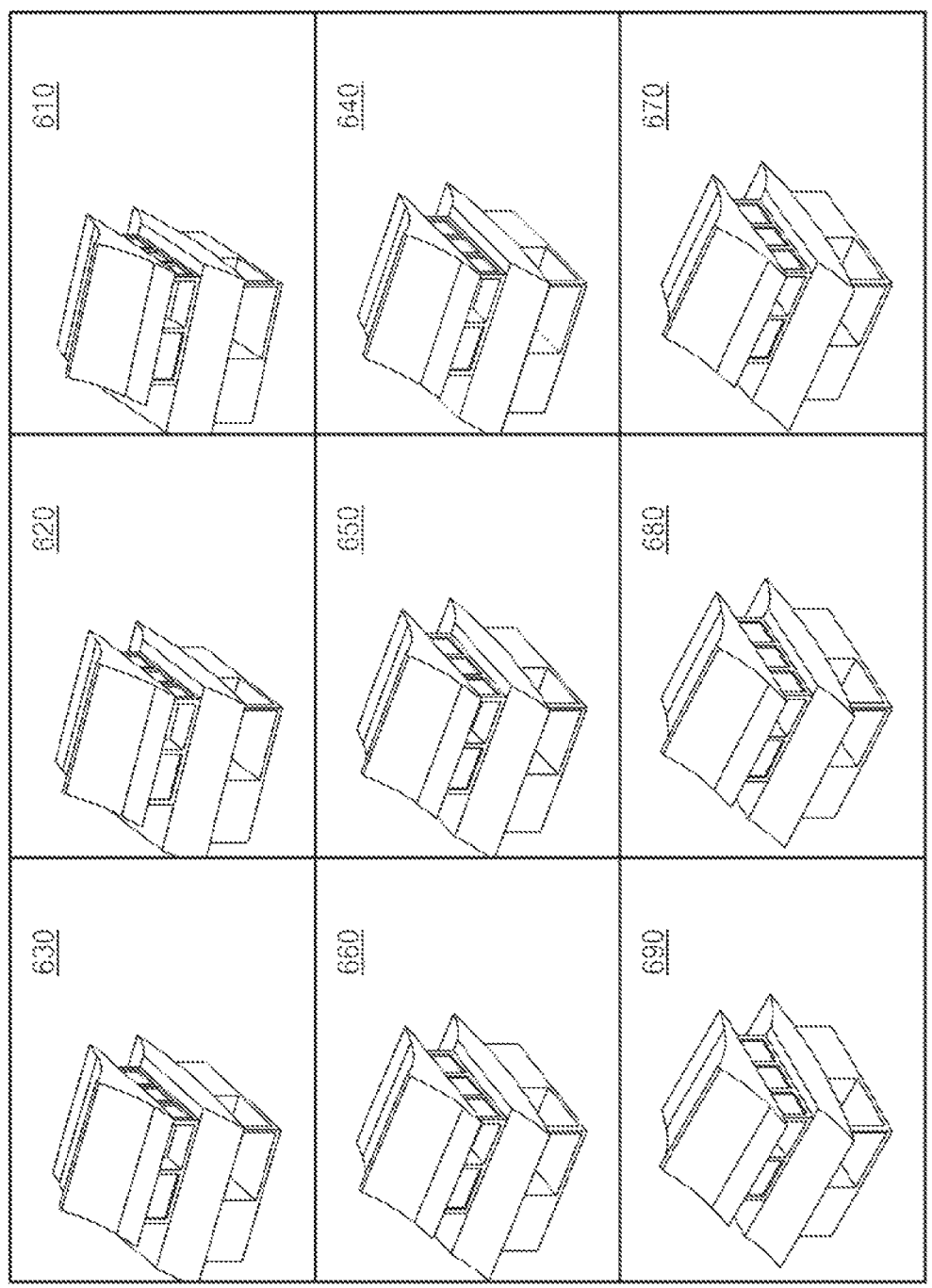
FIG. 6 is a diagram illustrating an example of each of multiple viewpoints obtained based on the multi-view rendering apparatus illustrated in FIG. 2.

FIG. 6 is a diagram illustrating an example of multiple viewpoints obtained based on the multi-view rendering apparatus 200 illustrated in FIG. 2. Referring to the example illustrated in FIG. 6, illustrated images are respectively obtained from nine different viewpoints for multi-view 3D display. When rendering is performed by the rendering unit 220 based on a viewpoint of a scene 650, a viewpoint that is disposed closest to the viewpoint of the scene 650 in the 3D space, from among the remaining eight viewpoints, is a viewpoint of a scene 640 or a viewpoint of a scene 660. Thus, the pixel value transformation unit 230 transforms pixel values that are obtained by performing rendering based on the viewpoint of the scene 650 into pixel values from the viewpoints of the scene 640 or 660, thereby obtaining pixel values from the viewpoint of the scene 640 or 660 without performing rendering calculations.

In an example, the pixel value transformation unit 230 transforms the pixel values obtained by rendering from the viewpoint of the scene 650 into pixel values from viewpoints other than the viewpoint of the scene 640 or 660, such as viewpoints of scenes 610 through 630 and viewpoints of scenes 670 through 690, thereby obtaining pixel values from the remaining viewpoints. However, viewpoints of scenes 610 through 630 and viewpoints of scenes 670 through 690 are not disposed closest to the viewpoint of the scene 650 in the 3D space. As a result, an amount of pixel values that is obtained from the remaining viewpoints through transformation is less than an amount of pixel values that is obtained from the viewpoint that is disposed closest to the viewpoint of the scene 650 through transformation. That is, transforming the pixel values obtained by rendering from the viewpoint of the scene 650 into pixel values from the viewpoints other than the viewpoint that is disposed closest to the viewpoint of the scene 650, i.e., the remaining viewpoints, leaves many pixels without pixel values. For example, an amount of pixels corresponding to the pixels obtained from the viewpoint of the scene 650 among the pixels obtained from the viewpoint of the scene 610 is less than an amount of pixels obtained from the viewpoint of the scene 640 or 660 that is adjacent to the viewpoint of the scene 650. As a result, when transforming the pixel values obtained by rendering based on the viewpoint of the scene 650 into pixel values from a viewpoint of a scene 610, an amount of pixels for which pixel values cannot be obtained, from among pixels on a scene observed based on the viewpoint of the scene 610, is greater than an amount of pixels for which pixel values cannot be obtained through transformation performed based on a viewpoint of the scene 640. Since there are many pixels without pixel values among the pixels on a scene observed from the viewpoint of the scene 610, a region of pixels increases in which rendering is additionally performed to arrive at the pixel values of the pixels. Here, an occlusion region is the region of pixels in which rendering is additionally performed to arrive at the pixel values of the pixels on the scene observed from the viewpoint of the scene 610.

Transformation of pixel values performed by the pixel value transformation unit 230 is based on 3D geometric transformation. The pixel value transformation unit 230 obtains positions of the 3D objects in the 3D space based on the depth map obtained by the rendering unit 220. As a result, the positions of the 3D objects of the 3D space in the world coordinate system are obtained. The world coordinate system represents absolute positions of the 3D objects in the 3D space. In an example, the positions of the 3D objects in the 3D space are represented as coordinate values and are obtained using a 4×4 transformation matrix of geometric transformation, such as translation transformation, rotation transformation, scaling transformation, or any other 4×4 transformation matrix known to one of ordinary skill in the art. The positions of the 3D objects in the 3D space are obtained using an inverse matrix of the transformation matrix that transforms the positions of the 3D objects in the world coordinate system into positions of the 3D objects in the viewing coordinate system. That is, the positions of the 3D objects in the 3D space are obtained by multiplying positions and the depth value of the pixels of the first viewpoint by the inverse matrix of the transformation matrix in which the positions of the 3D objects in the world coordinate system are transformed into positions of the 3D objects in the viewing coordinate system.

The pixel value transformation unit 230 obtains positions of pixels of the second viewpoint that correspond to pixels of the first viewpoint based on the positions of the 3D objects in the 3D space and a difference between the first viewpoint and the second viewpoint. In an example, the positions of the pixels of the second viewpoint are represented as coordinate values and are obtained using a 4×4 transformation matrix of geometric transformation, such as translation transformation, rotation transformation, scaling transformation, or any other 4×4 transformation matrix known to one of ordinary skill in the art. The positions of the pixels of the second viewpoint are obtained based on a transformation matrix that transforms the positions of the 3D objects in the world coordinate system into positions of the 3D objects in the viewing coordinate system depending on the second viewpoint. That is, the positions of the pixels of the second viewpoint that correspond to pixels of the first viewpoint are obtained by multiplying the positions of the 3D objects in the 3D space by the transformation matrix that transforms the positions of the 3D objects in the world coordinate system into positions of the 3D objects in the viewing coordinate system depending on the second viewpoint.

The pixel value transformation unit 230 obtains pixel values of the pixels of the second viewpoint by allocating pixel values of the pixels of the first viewpoint to the pixels of the second viewpoint at the corresponding positions. That is, pixel values of pixels of an existing viewpoint correspond to pixel values of pixels of the new viewpoint at the corresponding positions. The pixel value transformation unit 230 obtains pixel values from a viewpoint that is adjacent to the viewpoint for which rendering has been performed through the transformation described above. The transformation to obtain the positions of the 3D objects in the 3D space and the positions of the pixels of the second viewpoint is only an example. The positions of the 3D objects in the 3D space and the positions of the pixels of the second viewpoint may be obtained based on several types of geometric transformation.

The pixel value transformation unit 230 transforms the pixel values obtained from the viewpoint for which rendering has been performed by the rendering unit 220 into pixel values on a scene based on the new viewpoint that is adjacent to the viewpoint, thereby obtaining pixel values of the new viewpoint without performing rendering calculations for the new viewpoint. The pixel value transformation unit 230 uses the depth map obtained by the rendering unit 220 to perform transformation of pixel values.

The pixel value transformation unit 230 outputs the transformed pixel values to the image generating unit 250 to generate a multi-view 3D image for a multi-view display. In addition, the pixel value transformation unit 230 outputs the pixel values of the new viewpoint and the positions of the pixels to the occlusion region detecting unit 240 to detect pixels without pixel values among pixels on a scene observed from a viewpoint.

The occlusion region detecting unit 240 detects the occlusion region based on the pixel values received from the pixel value transformation unit 230 and the positions of the pixels. Here, the occlusion region is a remaining region other than a region represented by the transformed pixel values obtained by the pixel value transformation unit 230 in an image based on the second viewpoint. That is, the occlusion region is a region in which pixel values cannot be obtained from the pixels of the second viewpoint by transformation of the pixel value transformation unit 230. In an example, the occlusion region detecting unit 240 receives the pixel values and the positions of the pixels of the second viewpoint obtained from the pixel value transformation unit 230 and obtains coordinate values of the pixels of the second viewpoint without pixel values, thereby detecting the occlusion region.

The occlusion region occurs due to a difference between the viewpoint for which rendering has been performed and the new viewpoint. Based on this difference, pixels on a scene observed from the viewpoint for which rendering has been performed do not exactly correspond to pixels on a scene observed from the new viewpoint. That is, pixels of the new viewpoint that are not disposed on the positions which correspond to the positions of the pixels on the scene observed from the viewpoint for which rendering has been performed cannot have values of pixels by transformation of the pixel value transformation unit 230.

The occlusion region detecting unit 240 outputs the detected occlusion region to the viewpoint transformation unit 210. The detected occlusion region is a region of the pixels without the pixel values and which remains as an empty space in an image of the new viewpoint. Since an empty space cannot be allowed in a multi-view 3D image, the multi-view rendering apparatus 200 of FIG. 2 additionally performs rendering of the occlusion region in which the pixels do not have pixel values, thereby filling the empty space of the image of the second viewpoint. In this regard, when rendering of the occlusion region is additionally performed, since the occlusion region is a region of pixels on a scene observed from a different, new viewpoint from the first viewpoint for which rendering has been performed, the multi-view rendering apparatus 200 of FIG. 2 transforms an existing viewpoint for which rendering has been performed and performs rendering of the occlusion region. Thus, the occlusion region detecting unit 240 outputs the detected occlusion region to the viewpoint transformation unit 210 and the rendering unit 220 to perform rendering of the occlusion region based on the second viewpoint that is different from the first viewpoint for which rendering has been performed.

The viewpoint transformation unit 210 receives the occlusion region from the occlusion region detection unit 240 and transforms the viewpoint for rendering into the second viewpoint, and the rendering unit 220 performs rendering of the occlusion region based on the second viewpoint. The rendering unit 220 performs rendering of the occlusion region and outputs pixel values in the occlusion region that are obtained by rendering to the image generating unit 250.

As described above, the new viewpoint is adjacent to an existing one of a plurality of viewpoints set for a multi-view 3D display for which rendering has been performed. A difference between the new viewpoint and the existing viewpoint is not large, and, thus, the occlusion region in which rendering is to be additionally performed is a relatively small region. Since the multi-view rendering apparatus 200 of FIG. 2 performs rendering calculations in units of pixels, the amount of rendering calculations and time required for the rendering calculations are proportional to a width of a region in which rendering is to be performed.

The image generating unit 250 generates images from multiple viewpoints by combining the pixel values received from the rendering unit 220 and the pixel value transformation unit 230. That is, the image generating unit 250 receives the image information regarding all viewpoints set for a multi-view 3D display from the rendering unit 220 and the pixel value transformation unit 230 and combines the received image information according to viewpoints, thereby generating images from the viewpoints. In an example, the image generating unit 250 receives the pixel values that are result values obtained by performing rendering of the entire 3D space based on some viewpoints from the rendering unit 220, the pixel values that are result values obtained by performing rendering of the occlusion region based on the remaining viewpoints from the rendering unit 220, and the pixel values obtained by transformation of the pixel value transformation unit 230 among the pixel values of the pixels on a scene observed from the remaining viewpoints from the pixel value transformation unit 230. While the pixel values that are obtained by performing rendering of the entire 3D space themselves are an image obtained based on a viewpoint, an image of a scene observed from the viewpoints of the pixel values obtained by transformation of the pixel values is generated by combining the pixel values obtained through transformation and the pixel values obtained by additionally performing rendering of the occlusion region.

The image generating unit 250 outputs images that are generated according to all viewpoints set for a multi-view 3D display. The images according to the viewpoints are finally synthesized as one multi-view 3D image for a multi-view 3D display. A description of synthesizing the images of all the viewpoints as one multi-view 3D image can be understood by one of ordinary skill in the art.

Figure 5:
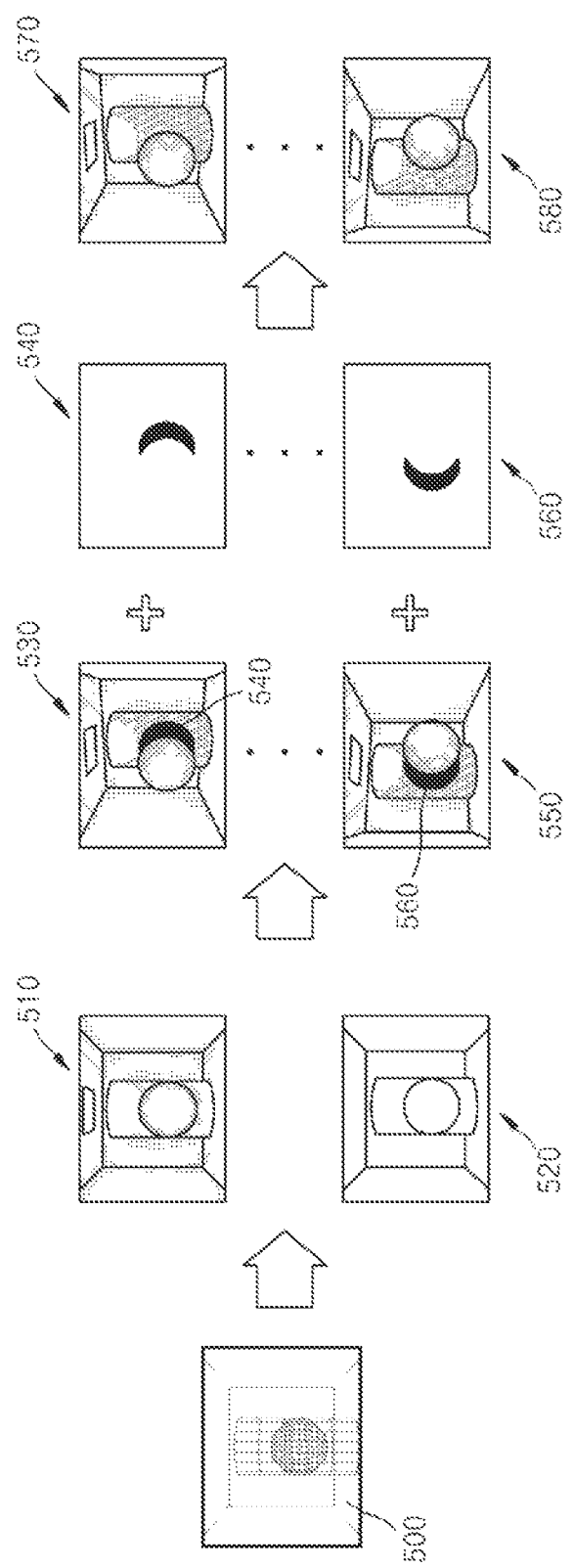
FIG. 5 is a diagram illustrating an example of an operation of the multi-view rendering apparatus illustrated in FIG. 2.

FIG. 5 is a diagram illustrating an example of an operation of the multi-view rendering apparatus 200 illustrated in FIG. 2. Referring to the example illustrated in FIG. 5, a 3D object 500 is modeled in the 3D space. The multi-view rendering apparatus 200 illustrated in FIG. 2 performs rendering of the 3D object 500 that is modeled in the 3D space based on a single viewpoint. In this regard, when a viewpoint that is a base rendering viewpoint is a viewpoint α, the viewpoint transformation unit 210 of the multi-view rendering apparatus 200 of FIG. 2 transforms a base rendering viewpoint into the viewpoint α to perform rendering on pixels on a scene observed from the viewpoint α.

A scene 510 is a rendered scene based on the viewpoint α because of performing rendering on pixels on the scene observed from the viewpoint α. The scene 510 represents that color values are mapped to the pixels on the scene based on performing rendering on the pixels on the scene observed from the viewpoint α. A depth map 520, obtained because of rendering based on the viewpoint α, represents that depth values are mapped to the pixels on the scene observed from the viewpoint α.

The pixel value transformation unit 230 of the multi-view rendering apparatus 200 of FIG. 2 transforms the pixel values on the scene 510 observed from the viewpoint α based on the depth map 520 into pixel values of pixels based on new viewpoints. When new viewpoints, which are adjacent to the viewpoint α for which rendering has been performed among the viewpoints set for a multi-view 3D display are viewpoints β and δ, a scene 530 and a scene 550 represent that pixel values obtained as a result of transformation based on the viewpoints β and δ are mapped to the pixels on the scene 530 and the scene 550.

An occlusion region 540 and an occlusion region 560 of the example illustrated in FIG. 5 represent a region in which pixels among the pixels on the scene 530 and the scene 550 observed from the viewpoints β and δ are not filled with pixel values through transformation. The occlusion region 540 is a region of the pixels that is not disposed on the positions that correspond to the positions of the pixels on a scene observed from the viewpoint α, among the pixels from the viewpoint β. Pixels of the occlusion region 540 are not filled with pixel values through transformation, and, thus, remain as empty spaces. The occlusion region detecting unit 240 of the multi-view rendering apparatus 200 of FIG. 2 detects the occlusion regions 540 and 560. The viewpoint transformation unit 210 transforms a base rendering viewpoint into the viewpoints β and δ, based on information regarding the detected occlusion regions 540 and 560. The rendering unit 220 receives the detected occlusion region 540 and 560 and performs rendering on the occlusion region 540 and 560. The multi-view rendering apparatus 200 of FIG. 2 obtains pixel values of the occlusion regions 540 and 560 based on additionally performing rendering on the occlusion regions 540 and 560.

The image generating unit 250 generates an image 570 of a scene observed from the viewpoint β by combining the pixel values obtained in the pixel value transformation unit 230 as a result of transformation based on the viewpoint β and the pixel values obtained in the rendering unit 220 as a result of performing rendering of the occlusion region 540 based on the viewpoint β. The image generating unit 250 generates an image 580 of a scene observed from the viewpoint δ through the same procedure. The image generating unit 250 generates images from all viewpoints set for a multi-view 3D display. The images from all the viewpoints are output to a multi-view 3D image synthesizing unit (not shown) and are synthesized as one multi-view 3D image.

Figure 7:
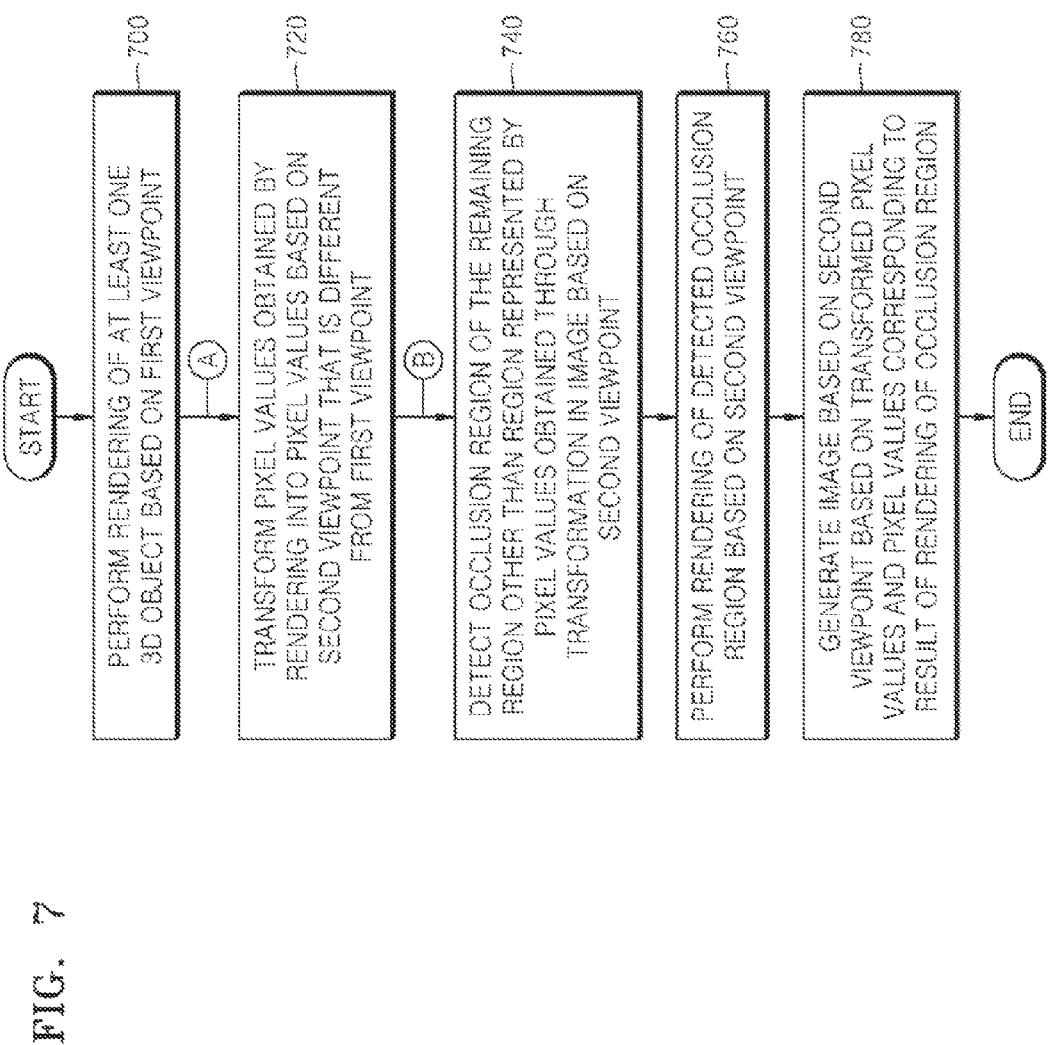
FIG. 7 is a flowchart illustrating an example of a method of multi-view rendering based on the multi-view rendering apparatus illustrated in FIG. 2.

FIG. 7 is a flowchart illustrating an example of a method of multi-view rendering based on the multi-view rendering apparatus 200 illustrated in FIG. 2. Referring to the example illustrated in FIG. 7, the method of multi-view rendering may be performed sequentially by using the multi-view rendering apparatus 200 illustrated in FIG. 2. Thus, although not described, the description of the multi-view rendering apparatus 200 of FIG. 2 also applies to the method of multi-view rendering illustrated in FIG. 7.

The multi-view rendering apparatus 200 of FIG. 2 performs (700) rendering of 3D objects based on a single viewpoint. The viewpoint is referred to as a first viewpoint. Since the multi-view rendering apparatus 200 of FIG. 2 performs rendering of 3D objects that are modeled based on a scene displayed from a point of view of an observer, a rendering viewpoint is transformed into the first viewpoint. Thus, the multi-view rendering apparatus 200 of FIG. 2 performs rendering of the 3D objects based on the transformed first viewpoint. Based on rendering performed by the multi-view rendering apparatus 200 of FIG. 2, pixel values of pixels on a scene observed from the first viewpoint are obtained. In addition, a depth map in which depth values of the pixels are mapped to the scene may be obtained.

The multi-view rendering apparatus 200 of FIG. 2 transforms (720) the pixel values obtained by the rendering of the 3D objects (700) into pixel values based on a new viewpoint that is different from the first viewpoint for which rendering has been performed. The new viewpoint is referred to as a second viewpoint. In this regard, the second viewpoint is one of a plurality of viewpoints set for a multi-view 3D display that is disposed closest to the first viewpoint in the 3D space.

Figure 8:
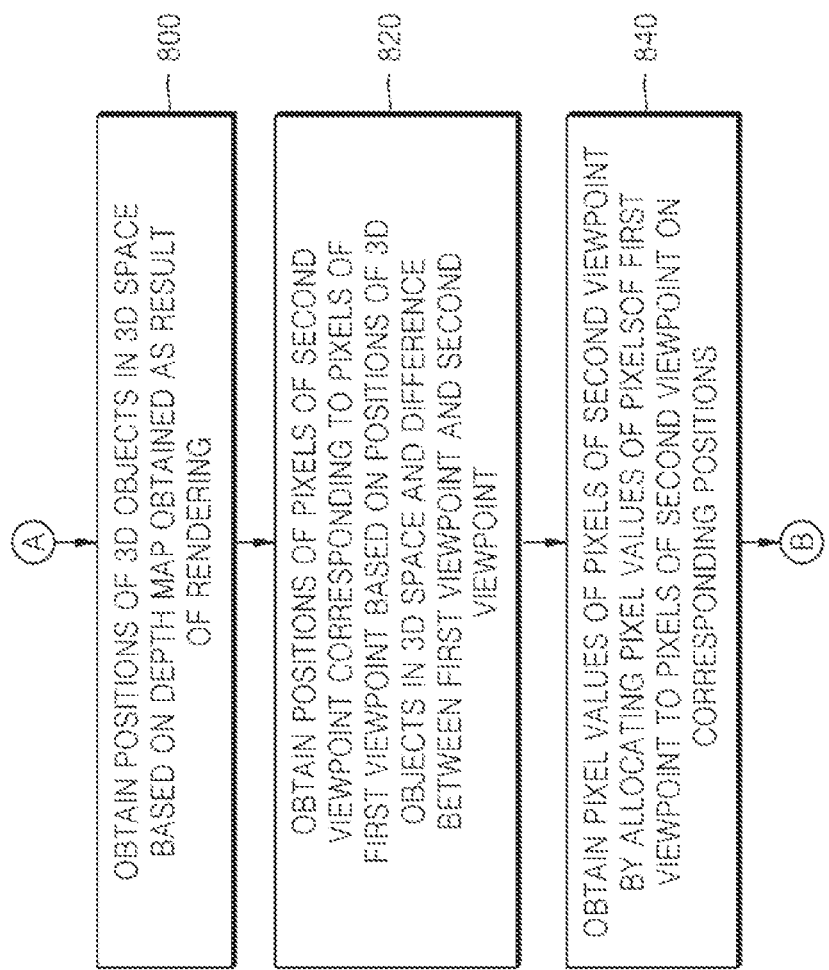
FIG. 8 is a flowchart illustrating an example of a transforming of pixel values of the multi-view rendering method illustrated in FIG. 7.

FIG. 8 is a flowchart illustrating an example of a transforming (720) of pixel values of the multi-view rendering method illustrated in FIG. 7. In the example illustrated in FIG. 8, the multi-view rendering apparatus 200 of FIG. 2 obtains (800) the positions of the 3D objects in the 3D space based on the depth map obtained in the rendering (700) of the 3D objects. That is, the positions of the 3D objects are obtained in a world coordinate system in the 3D space. The world coordinate system represents absolute positions of the 3D objects in the 3D space. In an example, the positions of the 3D objects in the 3D space are represented as coordinate values and may be obtained using a 4×4 transformation matrix of geometric transformation, such as translation transformation, rotation transformation, scaling transformation, or any other 4×4 transformation matrix known to one of ordinary skill in the art.

In an example, the positions of the 3D objects in the 3D space are obtained using an inverse matrix of the transformation matrix that transforms the positions of the 3D objects in the world coordinate system into positions of the 3D objects in a viewing coordinate system. That is, the positions of the 3D objects in the 3D space are obtained by multiplying positions and the depth value of pixels of the first viewpoint by the inverse matrix of the transformation matrix in which the positions of the 3D objects in the world coordinate system are transformed into the positions of the 3D objects in the viewing coordinate system.

The multi-view rendering apparatus 200 of FIG. 2 obtains (820) positions of pixels of the second viewpoint that correspond to pixels of the first viewpoint based on the obtained (800) positions of the 3D objects in the 3D space and a difference between the first viewpoint and the second viewpoint. In an example, the positions of pixels of the second viewpoint are represented as coordinate values and are obtained using a 4×4 transformation matrix of geometric transformation, such as translation transformation, rotation transformation, scaling transformation, or any other 4×4 transformation matrix known to one of ordinary skill in the art.

The positions of pixels of the second viewpoint are obtained using a transformation matrix that transforms the positions of the 3D objects in the world coordinate system into the positions of the 3D objects in the viewing coordinate system depending on the second viewpoint. That is, the positions of the pixels of the second viewpoint that correspond to pixels of the first viewpoint are obtained by multiplying the obtained (800) positions of the 3D objects in the 3D space by the transformation matrix that transforms the positions of the 3D objects in the world coordinate system into the positions of the 3D objects in the viewing coordinate system.

The multi-view rendering apparatus 200 of FIG. 2 obtains (840) pixel values of pixels of the second viewpoint by allocating pixel values of pixels of the first viewpoint to the pixels of the second viewpoint on the obtained (820) corresponding positions. That is, in an example, pixel values of pixels of the new viewpoint are obtained by allocating the pixel values of the pixels that correspond to pixels of an existing viewpoint for which rendering has been performed, to the positions of the pixels of the new viewpoint obtained by transformation. Pixel values of pixels of an existing viewpoint correspond to the pixel values of pixels of the new viewpoint on the corresponding positions. The multi-view rendering apparatus 200 of FIG. 2 obtains pixel values from a viewpoint that is adjacent to the viewpoint for which rendering has been performed, through the transformation operation described above.

Referring back to the example illustrated in FIG. 7, the multi-view rendering apparatus 200 of FIG. 2 detects (740) an occlusion region that is the remaining region other than a region represented by the pixel values obtained by the transforming (720) of the pixel values in an image based on the second viewpoint. That is, the multi-view rendering apparatus 200 of FIG. 2 detects the occlusion region in which pixel values cannot be obtained by the transforming (720) of the pixel values from the pixels of the second viewpoint. The occlusion region occurs due to a difference between the first viewpoint for which the rendering (700) of the 3D objects has been performed and the second viewpoint for which transformation (720) of the pixel values has been performed. The occlusion region is relatively small and includes the pixels that do not exactly correspond with the positions of the pixels of the first viewpoint from among pixels of the scene observed from the second viewpoint. In an example, the multi-view rendering apparatus 200 of FIG. 2 detects (740) the occlusion region by obtaining coordinate values of the pixels that constitute the remaining region other than the region represented as the pixel values obtained through the transformation (720) of the pixel values in an image based on the second viewpoint.

The multi-view rendering apparatus 200 of FIG. 2 performs (760) rendering of the detected occlusion region based on the second viewpoint. That is, the multi-view rendering apparatus 200 of FIG. 2 performs rendering of the occlusion region from a new viewpoint that is adjacent to the viewpoint for which the rendering (700) of the 3D objects has been performed, thereby obtaining pixel values of the pixels in the occlusion region.

The multi-view rendering apparatus 200 of FIG. 2 generates (780) an image based on a second viewpoint based on the transformed (720) pixel values and the pixel values obtained in the performed (760) rendering. The multi-view rendering apparatus 200 of FIG. 2 obtains image information of all viewpoints for a multi-view 3D display by repeatedly performing the rendering (700) of the 3D objects, the transforming (720) of the pixel values, the detecting (740) of the occlusion region, the performing (760) of the rendering, and the generating (780) of the image, thereby outputting images according to viewpoints. The images according to viewpoints that are output from the multi-view rendering apparatus 200 of FIG. 2 are finally synthesized as one multi-view 3D image for a multi-view 3D display through predetermined operations.

The units described herein may be implemented using hardware components and software components, such as, for example, microphones, amplifiers, band-pass filters, audio to digital converters, and processing devices. A processing device may be implemented using one or more general-purpose or special purpose computers, such as, for example, a processor, a controller and an arithmetic logic unit, a digital signal processor, a microcomputer, a field programmable array, a programmable logic unit, a microprocessor or any other device capable of responding to and executing instructions in a defined manner. The processing device may run an operating system (OS) and one or more software applications that run on the OS. The processing device also may access, store, manipulate, process, and create data in response to execution of the software. For purpose of simplicity, the description of a processing device is used as singular; however, one skilled in the art will appreciated that a processing device may include multiple processing elements and multiple types of processing elements. For example, a processing device may include multiple processors or a processor and a controller. In addition, different processing configurations are possible, such a parallel processors. As used herein, a processing device configured to implement a function A includes a processor programmed to run specific software. In addition, a processing device configured to implement a function A, a function B, and a function C may include configurations, such as, for example, a processor configured to implement both functions A, B, and C, a first processor configured to implement function A, and a second processor configured to implement functions B and C, a first processor to implement function A, a second processor configured to implement function B, and a third processor configured to implement function C, a first processor configured to implement function A, and a second processor configured to implement functions B and C, a first processor configured to implement functions A, B, C, and a second processor configured to implement functions A, B, and C, and so on.

The software may include a computer program, a piece of code, an instruction, or some combination thereof, for independently or collectively instructing or configuring the processing device to operate as desired. Software and data may be embodied permanently or temporarily in any type of machine, component, physical or virtual equipment, computer storage medium or device, or in a propagated signal wave capable of providing instructions or data to or being interpreted by the processing device. The software also may be distributed over network coupled computer systems so that the software is stored and executed in a distributed fashion. In particular, the software and data may be stored by one or more computer readable recording mediums. The computer readable recording medium may include any data storage device that can store data which can be thereafter read by a computer system or processing device. Examples of the computer readable recording medium include read-only memory (ROM), random-access memory (RAM), CD-ROMs, magnetic tapes, floppy disks, optical data storage devices. Also, functional programs, codes, and code segments for accomplishing the example embodiments disclosed herein can be easily construed by programmers skilled in the art to which the embodiments pertain based on and using the flow diagrams and block diagrams of the figures and their corresponding descriptions as provided herein.

Program instructions to perform a method described herein, or one or more operations thereof, may be recorded, stored, or fixed in one or more computer-readable storage media. The program instructions may be implemented by a computer. For example, the computer may cause a processor to execute the program instructions. The media may include, alone or in combination with the program instructions, data files, data structures, and the like. Examples of computer-readable storage media include magnetic media, such as hard disks, floppy disks, and magnetic tape; optical media such as CD ROM disks and DVDs; magneto-optical media, such as optical disks; and hardware devices that are specially configured to store and perform program instructions, such as read-only memory (ROM), random access memory (RAM), flash memory, and the like. Examples of program instructions include machine code, such as produced by a compiler, and files containing higher level code that may be executed by the computer using an interpreter. The program instructions, that is, software, may be distributed over network coupled computer systems so that the software is stored and executed in a distributed fashion. For example, the software and data may be stored by one or more computer readable storage mediums. In addition, functional programs, codes, and code segments for accomplishing the example embodiments disclosed herein can be easily construed by programmers skilled in the art to which the embodiments pertain based on and using the flow diagrams and block diagrams of the figures and their corresponding descriptions as provided herein. In addition, the described unit to perform an operation or a method may be hardware, software, or some combination of hardware and software. For example, the unit may be a software package running on a computer or the computer on which that software is running.

According to examples of the multi-view rendering apparatus and the method of multi-view rendering illustrated herein, image information of all viewpoints for the multi-view 3D display are obtained by repeatedly performing the rendering of the 3D objects based on a first viewpoint and the transforming of the pixel values, the detecting of the occlusion region, the rendering of the detected occlusion region, and the generating of the image based on a second viewpoint. Further, one multi-view 3D image for a multi-view 3D display is synthesized by using the image information of all viewpoints. Accordingly, the examples of the multi-view rendering apparatus and the method of multi-view rendering are enabled to display the multi-view 3D image in real-time.

A number of examples have been described above. Nevertheless, it will be understood that various modifications may be made. For example, suitable results may be achieved if the described techniques are performed in a different order and/or if components in a described system, architecture, device, or circuit are combined in a different manner and/or replaced or supplemented by other components or their equivalents. Accordingly, other implementations are within the scope of the following claims.

What is claimed is:

1. A method of multi-view rendering, the method comprising:
    rendering, by a renderer, a scene comprising one or more 3D objects from a first viewpoint and obtaining pixel values based on the rendering of the 3D objects with respect to the first viewpoint;
    creating, by a transformer, a new viewpoint of the scene by using the pixel values with respect to the first viewpoint to calculate new pixel values based on the new viewpoint, wherein the new viewpoint is different from the first viewpoint;
    detecting, by a detector, an occlusion region in the new viewpoint, the occlusion region being a region in which new pixel values are not calculated from the pixel values with respect to the first viewpoint; and
    rendering the detected occlusion region based on the new viewpoint,
    wherein the new viewpoint is a closest viewpoint to the first viewpoint in a 3D space among a plurality of viewpoints set for a multi-view 3D display so as to reduce the occlusion region in the new viewpoint.

2. The method of claim 1, wherein the calculating of the new pixel values comprises obtaining positions of pixels of the new viewpoint corresponding to pixels of the first viewpoint, and obtaining pixel values of the pixels of the new viewpoint by allocating the pixel values of the pixels of the first viewpoint to the pixels of the new viewpoint at the corresponding positions.

3. The method of claim 2, wherein the calculating of the new pixel values further comprises obtaining positions of the 3D objects in a 3D space and obtaining positions of the pixels of the new viewpoint,
    the obtaining of the positions of the 3D objects being based on a depth map obtained as a result of the rendering of the 3D objects,
    the obtaining of the positions of the pixels of the new viewpoint being based on the obtained positions of the 3D objects in the 3D space and on a difference between the first viewpoint and the new viewpoint.

4. The method of claim 1, wherein the detecting of the occlusion region comprises obtaining coordinate values of pixels within the occlusion region.

5. The method of claim 1, further comprising:
    generating an image of the scene from the new viewpoint, the generated image comprising the calculated new pixel values and pixel values obtained based on the rendering of the detected occlusion region.

6. The method of claim 5, further comprising:
    generating, by a generator, a new image of the scene for each of the plurality of viewpoints set for the multi-view 3D display, the generating of the new images comprising repeatedly performing the rendering of the scene from the first viewpoint, the calculating of the new pixel values, the detecting of the occlusion region, the rendering of the detected occlusion region, and the generating of the image of the scene based on the viewpoints.

7. The method of claim 6, wherein the generated new images each comprises pixel values obtained by the rendering of detected occlusion region and the calculated new pixel values.

8. The method of claim 7, wherein the generating of the new images further comprises combining the pixel values obtained by the rendering of the detected occlusion region and the calculated new pixel values for each of the new images.

9. The method of claim 1, wherein the rendering of the 3D objects of the scene comprises emitting rays in a direction of pixels on a screen, tracing a path on which rays emitted from the pixels are refracted or reflected, and determining a color of the pixels.

10. A non-transitory computer-readable recording medium having recorded thereon a program for executing the method of claim 1, wherein a processor executes the program.

11. A multi-view rendering apparatus, comprising:
    a rendering processor configured to render a scene comprising one or more 3D objects from a first viewpoint and an occlusion region from a new viewpoint of the scene that is different from the first viewpoint, and to obtain pixel values based on the rendering of the 3D objects with respect to the first viewpoint;
    a pixel value transforming processor configured to calculate the new viewpoint of the scene by using the pixel values with respect to the first viewpoint to calculate new pixel values with respect to the new viewpoint; and
    an occlusion detecting processor configured to detect the occlusion region in the new viewpoint, the occlusion region being a region in which new pixel values are not calculated from the pixel values with respect to the first viewpoint,
    wherein the new viewpoint is a closest viewpoint to the first viewpoint in a 3D space among a plurality of viewpoints set for a multi-view 3D display so as to reduce the occlusion region in the new viewpoint.

12. The apparatus of claim 11, wherein the pixel value transforming processor is further configured to obtain positions of pixels of the new viewpoint corresponding to pixels of the first viewpoint, and to obtain pixel values of the pixels of the new viewpoint by allocating the pixel values of the pixels of the first viewpoint to the pixels of the new viewpoint at the corresponding positions.

13. The apparatus of claim 12, wherein positions of the pixels of the new viewpoint are obtained based on positions of the 3D objects in a 3D space and on a difference between the first viewpoint and the new viewpoint, and
  wherein the positions of the 3D objects in the 3D space are obtained based on a depth map obtained by the rendering of the 3D objects by the rendering processor.

14. The apparatus of claim 11, wherein the occlusion detecting processor is further configured to obtain coordinate values of pixels within the occlusion region to detect the occlusion region.

15. The apparatus of claim 11, wherein the image generating processor is further configured to generate an image of the scene from the new viewpoint and a new image of the scene for each of the plurality of viewpoints set for the multi-view 3D display,
  the generated image comprising the calculated new pixel values and pixel values obtained by the rendering of the detected occlusion region,
  the generated new images being generated by repeatedly performing the rendering of the scene from the first viewpoint, the calculating of the new pixel values, the detecting of the occlusion region, the rendering of the detected occlusion region, and the generating of the new images of the scene based on the viewpoints.

16. The apparatus of claim 15, wherein the generated new images each comprises pixel values obtained by the rendering of the detected occlusion region and the calculated new pixel values.

17. The apparatus of claim 16, wherein the image generating processor is further configured to combine the pixel values obtained by the rendering of the detected occlusion region and the calculated new pixel values to generate each of the new images based on each of the plurality of viewpoints set for the multi-view 3D display.

18. The apparatus of claim 11, wherein the rendering processor is further configured to emit rays in a direction of pixels on a screen, trace a path on which rays emitted from the pixels are refracted or reflected, and determine a color of the pixels.

* * * * *